United States Patent
DeMars

(10) Patent No.: US 7,665,456 B2
(45) Date of Patent: *Feb. 23, 2010

(54) BARBECUE APPARATUS WITH SWINGOUT SHELF

(75) Inventor: Robert DeMars, La Quinta, CA (US)

(73) Assignee: IBT Holdings, Inc., Deerfield Beach, FL (US)

( * ) Notice: Subject to any disclaimer, the term of this patent is extended or adjusted under 35 U.S.C. 154(b) by 7 days.

This patent is subject to a terminal disclaimer.

(21) Appl. No.: 11/804,919

(22) Filed: May 22, 2007

(65) Prior Publication Data

US 2007/0215139 A1 Sep. 20, 2007

Related U.S. Application Data

(63) Continuation-in-part of application No. 10/916,657, filed on Aug. 12, 2004, now Pat. No. 7,222,619.

(51) Int. Cl.
 *A47J 37/07* (2006.01)
(52) U.S. Cl. .................. 126/38; 126/41 R; 126/9 R; 126/50; 126/332; 126/333
(58) Field of Classification Search .................. 126/38, 126/332, 333, 40, 50
See application file for complete search history.

(56) References Cited

U.S. PATENT DOCUMENTS

| | | | | |
|---|---|---|---|---|
| 206,252 A | * | 7/1878 | Lawson | 126/211 |
| 335,627 A | * | 2/1886 | Richmond | 126/333 |
| 345,545 A | * | 7/1886 | Ringen | 126/214 R |
| 626,838 A | * | 6/1899 | Low | 126/60 |
| 652,170 A | * | 6/1900 | Dibble | 126/260 |
| 732,470 A | * | 6/1903 | Tatham, Jr. | 126/39 R |
| 823,778 A | * | 6/1906 | Herbeck | 206/742 |
| 823,901 A | * | 6/1906 | Sturr | 206/740 |
| 1,153,597 A | * | 9/1915 | Buttler | 312/236 |
| 1,423,612 A | * | 7/1922 | Jewett | 211/85.31 |
| 1,600,830 A | * | 9/1926 | Lewis | 312/227 |
| 1,831,401 A | * | 11/1931 | Weidlich et al. | 312/324 |
| 2,506,698 A | * | 5/1950 | Beals | 126/25 A |
| 2,768,042 A | * | 10/1956 | Persinger et al. | 108/152 |

(Continued)

*Primary Examiner*—Carl D Price
(74) *Attorney, Agent, or Firm*—Dan M. De La Rosa

(57) ABSTRACT

A barbecue apparatus is provided, the apparatus comprises: a grill body comprising at least one cooking chamber and a fire bowl having a topside opening; at least one lid, and the lid being designed to cover the topside opening of the fire bowl during a closed position; at least one mounting assembly attached to the firebowl, and the mounting assembly having at least one aperture; and at least one swing out shelf system, and the system comprises at least one shelf and at least one bracket with opposing ends, a first end being connected to said shelf and a second end comprising at least one shaft extending downwardly therefrom and designed to fit and rotate within the aperture of the mounting assembly whereby the shelf can be swung between a first position for use and a second position for storage, at least a portion of the shelf being situated away from the topside opening of the fire bowl in the first position and the shelf is situated generally above the topside opening of the fire bowl during the second position, and the shelf assembly capable of being in the first use position when the lid is in the closed position.

40 Claims, 1 Drawing Sheet

U.S. PATENT DOCUMENTS

| | | | | |
|---|---|---|---|---|
| 2,791,959 | A * | 5/1957 | Pirz | 99/421 R |
| 2,816,538 | A * | 12/1957 | Miller et al. | 126/25 R |
| 2,944,862 | A * | 7/1960 | Heil | 312/237 |
| 3,094,113 | A * | 6/1963 | Avila | 126/30 |
| 3,338,628 | A * | 8/1967 | Evans | 297/188.2 |
| 3,915,529 | A * | 10/1975 | Bernier | 312/237 |
| 4,089,554 | A * | 5/1978 | Myers | 296/37.1 |
| 4,239,308 | A * | 12/1980 | Bradley | 312/201 |
| 4,363,313 | A * | 12/1982 | Smith | 126/9 R |
| 4,717,024 | A * | 1/1988 | Djezovic | 206/581 |
| 4,798,413 | A * | 1/1989 | Capelli | 297/161 |
| 5,069,196 | A * | 12/1991 | Schlosser et al. | 126/25 R |
| D325,123 | S * | 4/1992 | Tiramani | D3/275 |
| 5,184,599 | A * | 2/1993 | Stuart | 126/25 R |
| 5,694,917 | A * | 12/1997 | Giebel et al. | 126/41 R |
| 5,899,526 | A * | 5/1999 | LaPointe et al. | 297/173 |
| 6,142,140 | A * | 11/2000 | Shumaker | 126/9 B |
| 6,293,272 | B1 * | 9/2001 | Harneit | 126/37 B |
| 7,222,619 | B2 * | 5/2007 | DeMars | 126/38 |

* cited by examiner

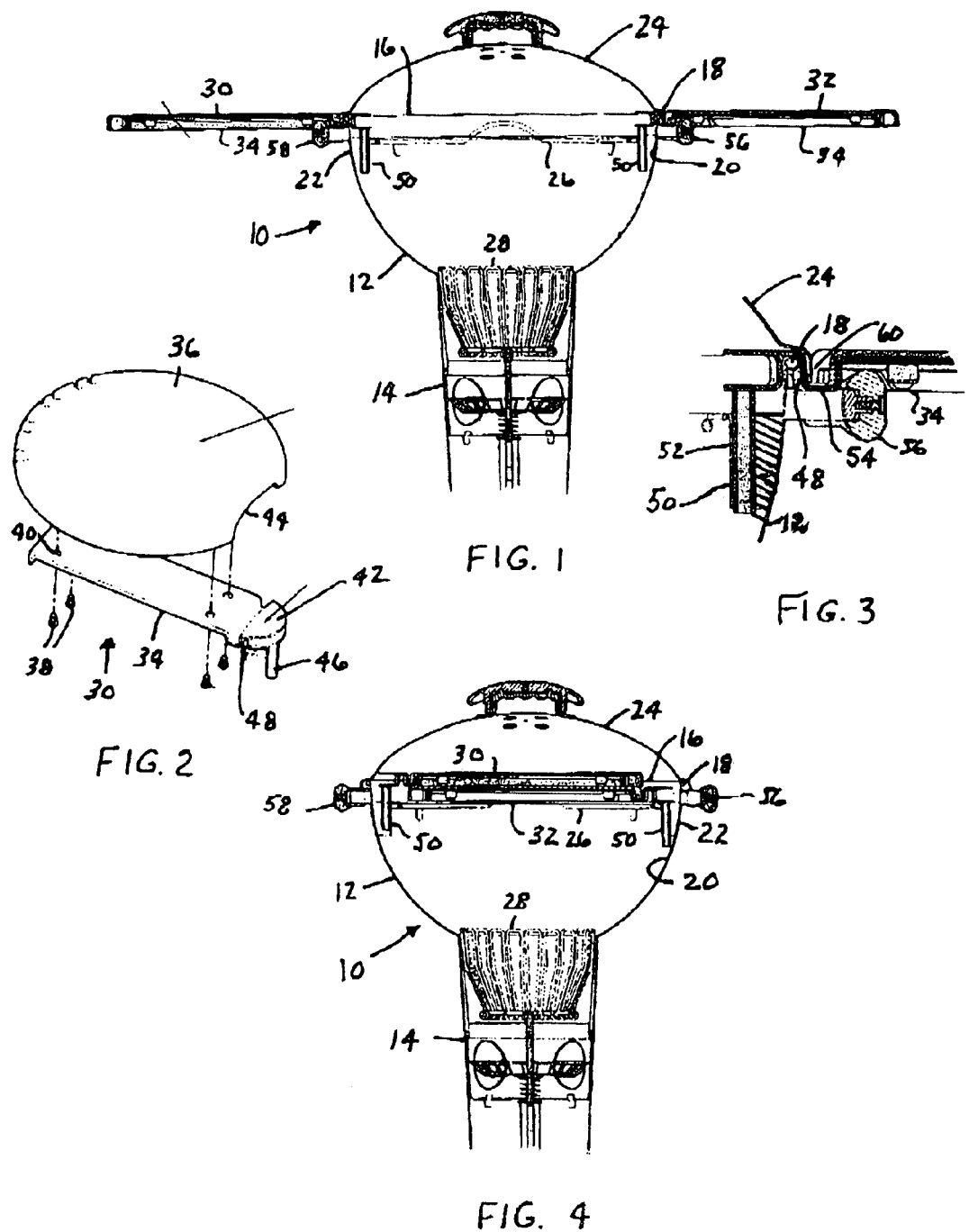

BARBECUE APPARATUS WITH SWINGOUT SHELF

RELATED APPLICATION

This application is a continuation-in-part of U.S. application Ser. No. 10/916,657, entitled "Storable Shelves for a Barbecue" which was filed on Aug. 12, 2004 and issued on May 29, 2007 as U.S. Pat. No. 7,222,619.

BACKGROUND OF THE INVENTION

1. Field of the Invention

The present invention relates to cooking appliances such as barbecues, and more particularly to barbecues having one or more associated therewith. The present invention provides for a barbecue apparatus comprising: a grill body comprising at least one cooking chamber and a fire bowl having a topside opening; at least one lid, and the lid being designed to cover the topside opening of the fire bowl during a closed position; at least one mounting assembly attached to the firebowl, and the mounting assembly having at least one aperture; and at least one swing out shelf system, and the system comprises at least one shelf and at least one bracket with opposing ends, a first end being connected to said shelf and a second end comprising at least one shaft extending downwardly therefrom and designed to fit and rotate within the aperture of the mounting assembly whereby the shelf can be swung between a first position for use and a second position for storage, at least a portion of the shelf being situated away from the topside opening of the fire bowl in the first position and the shelf is situated generally above the topside opening of the fire bowl during the second position, and the shelf assembly capable of being in the first use position when the lid is in the closed position.

2. Description of the Related Art

It is known in the art to provide a cooking appliance having one or more shelves associated therewith. The shelves may be movably attached to the barbecue so that they can be moved into a position of use such as outside of the barbecue for storage of food and implements thereon, and also movable into a position for storage of foods and implements thereon, and also movable into a position for storage of the shelves such as at the inside of the barbecue. Published U.S. Application No. 2003/0192526 of DeMars shows various embodiments of a barbecue and are unfolded to the outside of the barbecue for use. Published U.S. Application No. 2003/0111070 of DeMars and U.S. Pat. No. 6,606,987 of DeMars have similar disclosures. Published U.S. Application No. 2003/0111070 of DeMars also shows a barbecue with hinging shelves.

Still further examples of barbecues with hinging shelves are provided by U.S. Application No. 2003/0079737 of Wu and U.S. Pat. No. 6,513,515 of Wu.

Published U.S. Application No. 2002/0050274 of Hamilton et al. describes a portable stove having hinged shelves that cover the top of the stove when pivoted to an inner position. U.S. Pat. No. 5,016,607 of Doolittle describes opposite shelves which remain outside of a barbecue and which are hinged and can be raised and lowered. The hinges have latching mechanisms to latch the shelves in a raised position. U.S. Pat. No. 4,166,413 of Meszaros also describes a barbecue having shelves which are raised and lowered. U.S. Pat. No. 2,541,528 of McAvoy describes an arrangement of opposite hanging shelves similar to that in published U.S. Application No. 0050274 of Hamilton.

The various examples of the prior art discussed above describe barbecues having shelves which are hinged or otherwise pivotable about horizontal axis so that they fold to the inside of the barbecue for storage and to the outside of the barbecue for use. However, it may be desirable to provide other configurations and arrangements in which shelves are movable between a position on the inside of the barbecue for storage and a position on the outside of the barbecue for use.

SUMMARY OF THE INVENTION

The present invention provides for a barbecue having at least one storable shelf rotatable about a generally vertical pivot axis between a storage position inside the housing of the barbecue and a use position at the outside of the barbecue housing. The housing of the barbecue has an open upper end and inner and outer surfaces. A mounting assembly is mounted on the inner surface of the housing adjacent the open upper end and has a generally vertical aperture therein. The shelf includes an elongated shelf bracket having a shelf extending downwardly from an end thereof, with the shelf being rotatably received within the generally vertical aperture in the mounting assembly. A flat, generally disc shaped shelf is mounted on the elongated shelf bracket. The rotatable receipt of the shaft within generally vertical aperture enables pivoting movement of the elongated shelf bracket relative to the mounting assembly to swing the shelf between a storage position inside the housing and a use position outside the housing.

The housing has a rim at the open upper end thereof between the inner and outer surfaces. The elongated shelf bracket has a recess therein at the end thereof adjacent the shaft which receives the rim of the housing to seat the shelf bracket on the rim when the shelf is swung into the use position outside the housing. The elongated shaft bracket also has a portion thereof adjacent the recess which rests on and is supported by a handle mounted on the outside surface of the housing when the shelf is in the use position outside of the housing. A second recess in the elongated shelf bracket receives the lower edge of a lid which may be placed over the open upper end of the housing, when the shelf is in use position outside the housing.

In one embodiment, the barbecue has a pair of the shelves mounted on opposite portions of the housing. The pair of shelves are positioned, one over the other, for storage inside the housing when each of the shelves is swung into the storage position. When in the use positions, each of the shelves extends outwardly from the opposite sides of the barbecue housing. The barbecue has an opposite pair of the handles which provide support for the elongated support brackets when the shelves are in the use position outside of the barbecue housing.

In one embodiment, the present invention provides for a cooking apparatus comprising: a grill body comprising at least one cooking chamber and a fire bowl having a topside opening; at least one lid, the lid is designed to cover the topside opening of the fire bowl during a closed position; at least one elongated mounting assembly comprising at least one aperture, and at least one shelf assembly comprising at least one support bracket with opposing ends, a first end supporting a shelf and a second end comprising at least one shaft extending downwardly therefrom and designed to fit and rotate within the aperture of the mounting assembly whereby the shelf can be swung on a horizontal plane between a first position for use and a second position for storage, the shelf having a topside work surface and an underside, a substantial portion of the first end of the support bracket being situated on a substantial portion of the underside of the shelf for supporting the shelf, at least a portion of the shelf being situated away from the topside opening of the fire bowl in the first position and the shelf is situated above the topside opening of the fire bowl during the second position, the shelf assembly capable of being in the first use position when the lid is in the closed position.

In another embodiment, a portion of the mounting assembly of the apparatus is attached to the grill body. In yet another embodiment, a portion of the mounting assembly is attached to the fire bowl. In still another embodiment, a portion of the mounting assembly is attached to the lid.

In still yet another embodiment, the grill body has an external surface, and the mounting assembly is attached to the external surface of the grill body. In a further embodiment, the shaft is generally perpendicular to the shelf and the support bracket. In another further embodiment, the grill body comprises a rim situated adjacent to the topside opening of the fire bowl, and the support bracket has a recess for receiving the rim of the grill body to thereby support the support bracket when the shelf is in the first position.

In yet another further embodiment, the grill body further comprises an external surface and at least one handle attached to the external surface, and the handle is situated below an area where the shelf is situated during the first position and is designed to support the shelf. In still another further embodiment, elongated mounting assembly further comprises a second aperture and the apparatus comprises a second shelf assembly comprising at least one support bracket with opposing ends, a first end supporting a shelf and a second end comprising at least one shaft extending downwardly therefrom and designed to fit and rotate within the second aperture of the grill body, and the shelf having a topside work surface and an underside, a substantial portion of the support bracket being situated on the underside of the shelf for supporting the shelf, wherein the second shelf can be swung on a horizontal axis between a first position for use away from the topside opening of the fire bowl and a second position for storage wherein the shelf is situated above the topside opening of the fire bowl.

In still yet another further embodiment, the present invention provides for a barbecue cooking apparatus comprising: a grill body comprising at least one cooking chamber with a fire bowl, the grill body having an open upper end; at least one horizontal, elongated mounting assembly, the mounting assembly comprising at least one aperture; a removeable lid situated over the grill body to enclose the open upper end of the grill body in a closed position; and at least one shelf assembly comprising at least one support bracket with opposing ends, a first end supporting a shelf and a second end comprising at least one shaft extending downwardly therefrom and designed to fit and rotate within the aperture of the mounting assembly, wherein the shelf can be swung on a vertical axis between a first position away from the open upper end of the grill body and a second position for storage wherein the shelf is situated above open upper end of the grill body, the shelf having a topside work surface and an underside, a substantial portion of the support bracket being situated on a substantial portion of the underside of the shelf for supporting the shelf, and the shelf assembly capable of being in the first use position when the lid is in the closed position.

In a further embodiment, the present invention also describes a barbecue and cooking apparatus comprising: a grill body comprising at least one cooking chamber, the grill body having an open upper end, the grill body having an external surface; at least one horizontal, elongated mounting assembly having at least two apertures situated adjacent to the grill body; at least two handles; and at least two swing-out shelf assemblies, each of the assemblies comprising at least one support bracket with opposing ends, a first end supporting a shelf and a second end comprising at least one shaft extending downwardly therefrom and designed to fit and rotate within each of the apertures, each of the brackets having a recess, wherein each of the shelf assemblies can be swung between a first position for use and a second position for storage wherein the shelf is situated above the upper end of the grill body, each of the shelf having a topside work surface and an underside, a substantial portion of each of the support bracket being situated on a substantial portion of the underside of the shelf for supporting the shelf, the shelf assemblies capable of being in the first use position when the lid is in the closed position.

In another embodiment, the present invention provides for a barbecue apparatus comprising: a grill body comprising at least one cooking chamber and a fire bowl having a topside opening; at least one lid, and the lid being designed to cover the topside opening of the fire bowl during a closed position; at least one mounting assembly attached to the firebowl, and the mounting assembly having at least one aperture; and at least one swing out shelf system, and the system comprises at least one shelf and at least one bracket with opposing ends, a first end being connected to said shelf and a second end comprising at least one shaft extending downwardly therefrom and designed to fit and rotate within the aperture of the mounting assembly whereby the shelf can be swung between a first position for use and a second position for storage, at least a portion of the shelf being situated away from the topside opening of the fire bowl in the first position and the shelf is situated generally above the topside opening of the fire bowl during the second position, and the shelf assembly capable of being in the first use position when the lid is in the closed position.

In still another embodiment, the shaft is generally perpendicular to the shelf and the bracket. In still yet another embodiment, the mounting assembly has top and bottom sides, and the top side is generally V-shaped and has a central indentation situated between two elevated portions. In a further embodiment, the aperture of the mounting assembly is situated within the central indentation of the top side of the mounting assembly. In still a further embodiment, the bracket is generally V-shaped. In yet a further embodiment, the V-shaped bracket sits upon the V-shaped top side of the mounting assembly.

In yet a further embodiment, the apparatus of the present invention, wherein upon rotation of the shaft around the aperture of the mounting assembly, at least a portion of the bracket sits upon and is supported by at least one of the elevated portions of the top side of the mounting assembly. In still yet a further embodiment, the apparatus further comprises means for attaching the mounting assembly to the firebowl.

In another further embodiment, the grill body further comprises an external surface and at least one handle attached to the external surface, and the handle is situated below an area where the shelf is situated during the first position and is designed to support the shelf.

In still another further embodiment, the present invention relates to a barbecue apparatus comprising: a grill body comprising at least one cooking chamber and a fire bowl having a topside opening; at least one lid, and the lid being designed to cover the topside opening of the fire bowl during a closed position; at least one framework situated below and designed to support the fire bowl; at least one mounting assembly attached to the framework, the mounting assembly having at least one aperture; and at least one swing out shelf system, and the system comprises at least one shelf and at least one bracket with opposing ends, a first end being connected to the shelf and a second end comprising at least one shaft extending downwardly therefrom and designed to fit and rotate within the aperture of the mounting assembly whereby the shelf can be swung between a first position for use and a second position for storage, at least a portion of the shelf being situated away from the topside opening of the fire bowl in the first position and the shelf is situated generally above the topside opening of the fire bowl during the second position, and the shelf assembly capable of being in the first use position when the lid is in the closed position.

In another embodiment, the framework functions as a base for the apparatus. In still another embodiment, the shaft is generally perpendicular to the shelf and the bracket. In yet another embodiment, the grill body further comprises an external surface and at least one handle attached to the external surface, and the handle being situated below an area where the shelf is situated during the first position and is designed to support the shelf. In still yet another embodiment, the mounting assembly has top and bottom sides, and the top side is generally V-shaped and has a central indentation situated between two elevated portions; and the aperture of the mounting assembly is situated within the central indentation of the top side of top mounting assembly.

In a further embodiment, the apparatus of the present invention, wherein upon rotation of the shaft around the aperture of the mounting assembly, and at least a portion of the bracket sits upon and is supported by at least one of the elevated portions of the top side of the mounting assembly.

In still a further embodiment, the present invention provides for a barbecue apparatus comprising: a grill body comprising at least one cooking chamber and a fire bowl having a topside opening; at least one lid, said lid being designed to cover said topside opening of said fire bowl during a closed position; at least one handle attached to said external surface; at least one mounting assembly attached to said handle, said mounting assembly having at least one aperture; and at least one swing out shelf system, the system comprises at least one shelf and at least one bracket with opposing ends, a first end being connected to the shelf and a second end comprising at least one shaft extending downwardly therefrom and designed to fit and rotate within the aperture of the mounting assembly whereby the shelf can be swung between a first position for use and a second position for storage, at least a portion of the shelf being situated away from the topside opening of the fire bowl in the first position and the shelf is situated generally above the topside opening of the fire bowl during the second position, the shelf assembly is capable of being in: the first use position when the lid is in the closed position, and the handle is situated below an area where the shelf is situated during the first position and is designed to support the shelf. In another further embodiment, the shaft is generally perpendicular to the shelf and the bracket.

In yet a further embodiment, the mounting assembly has top and bottom sides, and the top side is generally V-shaped and has a central indentation situated between two elevated portions; and the aperture of the mounting assembly is situated within the central indentation of the top side of the mounting assembly.

In another further embodiment, the present invention relates to a barbecue apparatus comprising: a grill body comprising at least one cooking chamber and a fire bowl having a topside opening; at least one lid, said lid being designed to cover said topside opening of said fire bowl during a closed position; at least one mounting assembly attached to said lid, said mounting assembly having at least one aperture; and at least one swing out shelf system, said system comprises at least one shelf and at least one bracket with opposing ends, a first end being connected to said shelf and a second end comprising at least one shaft extending downwardly therefrom and designed to fit and rotate within said aperture of said mounting assembly whereby said shelf can be swung between a first position for use and a second position for storage, at least a portion of said shelf being situated away from said topside opening of said fire bowl in said first position and said shelf is situated generally above said topside opening of said fire bowl during said second position, said shelf assembly capable of being in said first use position when said lid is in said closed position. In still another embodiment, the mounting assembly is moveable from the lid during the first use position and the second storage position.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 1 is a front sectional view of a barbecue with storable shelves in accordance with the invention;

FIG. 2 is an exploded perspective view of one of the shelf assemblies of the barbecue of FIG. 1;

FIG. 3 is an enlarged sectional view of a portion of FIG. 1 showing the details of the manner in which one of the shelf assemblies is positioned and supported when in the use position outside of the barbecue; and FIG. 4 is a front sectional view similar to the view of FIG. 1 but with the two shelf assemblies positioned in overlapping relation for storage within the barbecue.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

FIG. 1 shows a barbecue having storable shelves in accordance with the invention. The barbecue 10 includes a housing 12 mounted at the top of an upright stand 14. The housing has an upper open end 16 having a circular rim 18 between an inside surface 20 and ann outside surface 22 of the housing 12. The open upper end 16 may be enclosed by a mating lid 24 which can be placed over the rim 18 of the housing 12.

The barbecue 10 includes a grate 28 positioned at the inside of the housing 12 just below the rim 18. Food to be cooked is placed on the grate 26 and is heated by charcoal containing apparatus 28 positioned below the grate 26. Such details are unimportant to the storable shelves in accordance with the present invention. However, reference is made to co-pending application Ser. No. 10/359,804 filed on Feb. 7, 2003 by Alan D. Crawford et al. and entitled "QUICK START BARBECUE", for detailed example of a barbecue which may be used with the storable shelves in accordance with the present invention.

In accordance with the invention, the barbecue 10 has a pair of opposite shelf assemblies 30 and 32 mounted on the housing 12 at opposite sides thereof. The shelf assemblies 30 and 32 are pivotable about vertical axes, and can be swung between use positions outside of the housing 12 and storage positions within the housing 12. The shelf assemblies 30 and 32 are shown in the use positions outside of the housing 12 in the view of FIG. 1. When in the use positions, the shelf assemblies 30 and 32 extend outwardly from the opposite sides of the housing 12 with a function to receive and support food containers, cooking utensils and other such objects. When the shelf assemblies 30 and 32 are swung to the opposite storage positions, they reside in overlapping relations for storage within the housing 12, as shown in FIG. 4.

FIG. 2 is an exploded perspective view of one of the shelf assemblies 30. The other shelf assembly 32 is of identical configuration. As shown in FIG. 2, the shelf assembly 30 includes an elongated shelf bracket 34 on which is mounted a shelf 36. In the present example, the shelf 36 is a flat, disc-shaped configuration, and is secured to the shelf bracket 34 by a plurality of screws 38 which extend upwardly through holes 40 in the elongated shelf bracket 34 and into the shelf 36.

The elongated shelf bracket 34 has an end 42 which extends by a small amount beyond an adjacent edge 44 of the shelf 36. The end 42 has a generally cylindrical shaft 46 extending downwardly therefrom. The end 42 of the shelf bracket 34 also has a recess 48 therein adjacent the shaft 46.

As shown in FIGS. 1 and 4, the barbecue 10 is provided with an opposite pair of mounting assemblies 50. The mounting assemblies 50 which are mounted on the inside surface 20 of the housing 12 just below the rim 18 of the open upper end 16 are each provided with a vertical aperture 52 extending downwardly therethrough. Each of the vertical apertures 52 is of generally cylindrical configuration and receives a shaft 46 of the shelf bracket 34 of one of the shelf assemblies 30 and 32. The shafts 46 are free to rotate within the apertures 52, thereby permitting the shelf assemblies 30 and 32 to undergo swinging motion between use positions outside the barbecue housing 12 and the storage positions inside of the housing 12. The shaft 46 can also undergo vertical movement relative to the apertures 52, permitting the shelf assemblies 30 and 32 to be raised for movement between the storage and use positions as well as for storage in overlapping relationship within the housing 12 as described below.

FIG. 3 is a detailed view of the right hand shelf assembly 32 when in the use position outside of the barbecue housing 12. In this position, the rim 18 of the housing 12 extends into the recess 48 of the elongated shelf bracket 34, enabling the shelf assembly 32 to rest on the rim 18. At the same time, a portion 54 of the shelf bracket rests on a handle 56 attached to the outside surface 22 of the barbecue housing 12, to provide further support for the shelf assembly 32. The left hand shelf assembly 30 functions in similar fashion, and nests on the rim 18 and is supported in part by a handle 58 mounted on the outside surface 22 of the barbecue housing 12 opposite the handle 56.

As shown in FIG. 3 each of the elongated shelf brackets 34 has a recess 60 extending therein from an upper surface thereof adjacent the first recess 48. The recess 60 receives a lip at a lower edge of the lid 24 therein when the shelf is in the use position and the lid 24 is placed over the open upper end 16 of the housing 12.

The opposite shelf assemblies 30 and 32 are placed in the use positions outside of the barbecue housing 12 by lifting and then lowering each shelf assembly 30 and 32 as necessary so that the recess 48 in each shelf bracket 34 is positioned over the rim 18 of the housing 12, and the portion 54 of each is disposed on a respective one of the handles 56 and 58. This position is shown in FIG. 1 as well as in the detailed view of FIG. 3.

Movement of the shelf assemblies 30 and 32 into the housing 12 for storage therein is accomplished by again lifting each of the shelf assemblies 30 and 32 as necessary so that the rim 18 is free of the recess 48 in each of the shelf brackets 34. Each of the shelf assemblies 30 and 32 is then swung inwardly, allowing the shafts 46 to rotate within the vertical apertures 52 in the mounting assemblies 50, until the shelf assemblies 30 and 32 are disposed inside the housing 12. The shelf assemblies 30 and 32 are moved into the storage position at the inside of the housing 12 in succession, with one being moved into the storage position followed by the other being moved into the storage position. In the example of FIG. 4, the right hand shelf assembly 32 is the first to have been moved into the storage position. Where it reaches the interior of the housing 12, the shelf assembly 32 is lowered onto the grate 26. Again, upward and downward movement of the shelf asemblies 30 and 32 as they are swung back and forth in this fashion is permitted by vertical movement of the shafts 46 within the vertical aperture 52. Following disposition of the right hand shelf assembly 32 onto the grate 26, the left hand shelf assembly 30 is raised and swung to the inside of the housing 12 where it is placed on top of the first shelf assembly 32. The order of placement of the shelf assemblies 30 and 32 at the interior of the housing 12 is unimportant, and the left hand shelf assembly 34 can be positioned there first with the right hand shelf assembly 32 being next swung into the interior of the housing 12 for placement on top of the assembly 30.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A barbecue apparatus comprising:
 a grill body comprising at least one cooking chamber and a fire bowl having a topside opening;
 at least one lid, said lid being designed to cover said topside opening of said fire bowl during a closed position;
 at least one mounting assembly attached to said firebowl, said mounting assembly having at least one aperture; and
 at least one swing out shelf system, said system comprises at least one shelf and at least one bracket with opposing ends, a first end being connected to said shelf and a second end comprising at least one shaft extending downwardly therefrom and designed to fit and rotate within said aperture of said mounting assembly whereby said shelf can be swung between a first position for use and a second position for storage, at least a portion of said shelf being situated away from said topside opening of said fire bowl in said first position and said shelf is situated generally above said topside opening of said fire bowl during said second position, said shelf assembly capable of being in said first use position when said lid is in said closed position.

2. The apparatus of claim 1 wherein said shaft is generally perpendicular to said shelf and said bracket.

3. The apparatus of claim 1 wherein said mounting assembly has top and bottom sides, said top side being generally V-shaped and having a central indentation situated between two elevated portions.

4. The apparatus of claim 3 wherein said aperture of said mounting assembly is situated within said central indentation of said top side of said mounting assembly.

5. The apparatus of claim 3 wherein said bracket is generally V-shaped.

6. The apparatus of claim 5 wherein said V-shaped bracket sits upon said V-shaped top side of said mounting assembly.

7. The apparatus of claim 3 wherein upon rotation of said shaft around said aperture of said mounting assembly, at least a portion of said bracket sits upon and is supported by at least one of said elevated portions of said top side of said mounting assembly.

8. The apparatus of claim 1 further comprising means for attaching said mounting assembly to said firebowl.

9. The apparatus of claim 1 wherein said grill body further comprises an external surface and at least one handle attached to said external surface, said handle being situated below an area where said shelf is situated during said first position and is designed to support said shelf.

10. A barbecue apparatus comprising:
a grill body comprising at least one cooking chamber and a fire bowl having a topside opening;
at least one lid, said lid being designed to cover said topside opening of said fire bowl during a closed position;
at least one framework situated below and designed to support said fire bowl;
at least one mounting assembly attached to said framework, said mounting assembly having at least one aperture; and
at least one swing out shelf system, said system comprises at least one shelf and at least one bracket with opposing ends, a first end being connected to said shelf and a second end comprising at least one shaft extending downwardly therefrom and designed to fit and rotate within said aperture of said mounting assembly whereby said shelf can be swung between a first position for use and a second position for storage, at least a portion of said shelf being situated away from said topside opening of said fire bowl in said first position and said shelf is situated generally above said topside opening of said fire bowl during said second position, said shelf assembly capable of being in said first use position when said lid is in said closed position.

11. The apparatus of claim 10 wherein said framework functions as a base for said apparatus.

12. The apparatus of claim 10 wherein said shaft is generally perpendicular to said shelf and said bracket.

13. The apparatus of claim 10 wherein said grill body further comprises an external surface and at least one handle attached to said external surface, said handle being situated below an area where said shelf is situated during said first position and is designed to support said shelf.

14. The apparatus of claim 10 wherein said mounting assembly has top and bottom sides, said top side being generally V-shaped and having a central indentation situated between two elevated portions; said aperture of said mounting assembly is situated within said central indentation of said top side of said mounting assembly.

15. The apparatus of claim 14 wherein upon rotation of said shaft around said aperture of said mounting assembly, at least a portion of said bracket sits upon and is supported by at least one of said elevated portions of said top side of said mounting assembly.

16. A barbecue apparatus comprising:
a grill body comprising at least one cooking chamber and a fire bowl having a topside opening;
at least one lid, said lid being designed to cover said topside opening of said fire bowl during a closed position;
at least one handle attached to said external surface;
at least one mounting assembly attached to said handle, said mounting assembly having at least one aperture; and
at least one swing out shelf system, said system comprises at least one shelf and at least one bracket with opposing ends, a first end being connected to said shelf and a second end comprising at least one shaft extending downwardly therefrom and designed to fit and rotate within said aperture of said mounting assembly whereby said shelf can be swung between a first position for use and a second position for storage, at least a portion of said shelf being situated away from said topside opening of said fire bowl in said first position and said shelf is situated generally above said topside opening of said fire bowl during said second position, said shelf assembly capable of being in said first use position when said lid is in said closed position, said handle being situated below an area where said shelf is situated during said first position and is designed to support said shelf.

17. The apparatus of claim 16 wherein said shaft is generally perpendicular to said shelf and said bracket.

18. The apparatus of claim 16 wherein said mounting assembly has top and bottom sides, said top side being generally V-shaped and having a central indentation situated between two elevated portions; said aperture of said mounting assembly is situated within said central indentation of said top side of said mounting assembly.

19. A barbecue apparatus comprising:
a grill body comprising at least one cooking chamber and a fire bowl having a topside opening;
at least one lid, said lid being designed to cover said topside opening of said fire bowl during a closed position;
at least one mounting assembly attached to said lid, said mounting assembly having at least one aperture; and
at least one swing out shelf system, said system comprises at least one shelf and at least one bracket with opposing ends, a first end being connected to said shelf and a second end comprising at least one shaft extending downwardly therefrom and designed to fit and rotate within said aperture of said mounting assembly whereby said shelf can be swung between a first position for use and a second position for storage, at least a portion of said shelf being situated away from said topside opening of said fire bowl in said first position and said shelf is situated generally above said topside opening of said fire bowl during said second position, said shelf assembly capable of being in said first use position when said lid is in said closed position.

20. The apparatus of claim 19 wherein said mounting assembly is moveable from said lid during said first use position and said second storage position.

21. A cooking apparatus comprising:
a grill body comprising at least one cooking chamber and a fire bowl having a topside opening;
at least one lid, said lid being designed to cover said topside opening of said fire bowl during a closed position;
at least one elongated mounting assembly comprising at least one aperture, and at least one shelf assembly comprising at least one support bracket with opposing ends, a first end supporting a shelf and a second end comprising at least one shaft extending downwardly therefrom and designed to fit and rotate within said aperture of said mounting assembly whereby said shelf can be swung on a horizontal plane between a first position for use and a second position for storage, said shelf having a topside work surface and an underside, a substantial portion of said first end of said support bracket being situated on a substantial portion of said underside of said shelf for supporting said shelf, at least a portion of said shelf being situated away from said topside opening of said fire bowl in said first position and said shelf is situated above said topside opening of said fire bowl during said second position, said shelf assembly capable of being in said first use position when said lid is in said closed position.

22. The apparatus of claim 21 wherein portion of said mounting assembly is attached to said grill body.

23. The apparatus of claim 21 wherein portion of said mounting assembly is attached to said fire bowl.

24. The apparatus of claim 21 wherein portion of said mounting assembly is attached to said lid.

25. The apparatus of claim 22 wherein said grill body has an external surface, said mounting assembly being attached to said external surface of said grill body.

26. The apparatus of claim 21 wherein said shaft is generally perpendicular to said shelf and said support bracket.

27. The apparatus of claim 21 wherein said grill body comprises a rim situated adjacent to said topside opening of said fire bowl, said support bracket having a recess for receiving said rim of said grill body to thereby support said support bracket when said shelf is in said first position.

28. The apparatus of claim 21 further comprising a stand.

29. The apparatus of claim 21 wherein said grill body further comprises an external surface and at least one handle attached to said external surface, said handle being situated below an area where said shelf is situated during said first position and is designed to support said shelf.

30. The apparatus of claim 21 wherein said elongated mounting assembly further comprises a second aperture and said apparatus comprises a second shelf assembly comprising at least one support bracket with opposing ends, a first end supporting a shelf and a second end comprising at least one shaft extending downwardly therefrom and designed to fit and rotate within said second aperture of said grill body, said shelf having a topside work surface and an underside, a substantial portion of said support bracket being situated on the underside of said shelf for supporting said shelf, wherein said second shelf can be swung on a horizontal axis between a first position for use away from said topside opening of said fire bowl and a second position for storage wherein said shelf is situated above said topside opening of said fire bowl.

31. The apparatus of claim 30 wherein said first shelf is situated above said second shelf during said storage position and said first and second shelves are situated above said topside opening of said fire bowl.

32. The apparatus of claim 30 wherein said first and second shelves are positioned side by side during said storage position and said first and second shelves are situated above said topside opening of said fire bowl.

33. A barbecue cooking apparatus comprising:
a grill body comprising at least one cooking chamber with a fire bowl, said grill body having an open upper end;
at least one horizontal, elongated mounting assembly, said mounting assembly comprising at least one aperture;
a removeable lid situated over said grill body to enclose said open upper end of said grill body in a closed position; and
at least one shelf assembly comprising at least one support bracket with opposing ends, a first end supporting a shelf and a second end comprising at least one shaft extending downwardly therefrom and designed to fit and rotate within said aperture of said mounting assembly, wherein said shelf can be swung on a vertical axis between a first position away from said open upper end of said grill body and a second position for storage wherein said shelf is situated above open upper end of said grill body, said shelf having a topside work surface and an underside, a substantial portion of said support bracket being situated on a substantial portion of said underside of said shelf for supporting said shelf, said shelf assembly capable of being in said first use position when said lid is in said closed position.

34. The apparatus of claim 33 wherein portion of said mounting assembly is attached to said grill body.

35. The apparatus of claim 34 wherein said grill body has an external surface, said mounting assembly being attached to said external surface of said grill body.

36. The apparatus of claim 33 wherein portion of said mounting assembly is attached to said fire bowl.

37. The apparatus of claim 33 wherein portion of said mounting assembly is attached to said lid.

38. The apparatus of claim 33 wherein said grill body comprises a rim situated adjacent to said topside opening of said fire bowl, said support bracket having a recess for receiving said rim of said grill body to thereby support said support bracket when said shelf is in said first position.

39. The apparatus of claim 33 wherein said grill body further comprises an external surface and at least one handle attached to said external surface, said handle being situated below an area where said shelf is situated during said first position and is designed to support said shelf.

40. A barbecue and cooking apparatus comprising:
a grill body comprising at least one cooking chamber, said grill body having an open upper end, said grill body having an external surface;
at least one horizontal, elongated mounting assembly having at least two apertures situated adjacent to said grill body;
at least two handles; and
at least two swing-out shelf assemblies, each of said assemblies comprising at least one support bracket with opposing ends, a first end supporting a shelf and a second end comprising at least one shaft extending downwardly therefrom and designed to fit and rotate within each of said apertures, each of said brackets having a recess, wherein each of said shelf assemblies can be swung between a first position for use and a second position for storage wherein said shelf is situated above said upper end of said grill body, each of said shelf having a topside work surface and an underside, a substantial portion of each of said support bracket being situated on a substantial portion of said underside of said shelf for supporting said shelf, said shelf assemblies capable of being in said first use position when said lid is in said closed position.

* * * * *